(12) United States Patent
Murakami

(10) Patent No.: US 12,519,170 B2
(45) Date of Patent: Jan. 6, 2026

(54) BATTERY HOLDER

(71) Applicant: MAKITA CORPORATION, Anjo (JP)

(72) Inventor: Masaki Murakami, Anjo (JP)

(73) Assignee: MAKITA CORPORATION, Anjo (JP)

( * ) Notice: Subject to any disclaimer, the term of this patent is extended or adjusted under 35 U.S.C. 154(b) by 726 days.

(21) Appl. No.: 17/881,107

(22) Filed: Aug. 4, 2022

(65) Prior Publication Data

US 2023/0088100 A1 Mar. 23, 2023

(30) Foreign Application Priority Data

Sep. 17, 2021 (JP) .................. 2021-151969

(51) Int. Cl.
*H01M 50/264* (2021.01)
*H01M 50/247* (2021.01)
*H01M 50/256* (2021.01)

(52) U.S. Cl.
CPC ....... *H01M 50/264* (2021.01); *H01M 50/247* (2021.01); *H01M 50/256* (2021.01); *H01M 2220/30* (2013.01)

(58) Field of Classification Search
CPC . H01M 50/264; H01M 50/247; H01M 50/256
See application file for complete search history.

(56) References Cited

U.S. PATENT DOCUMENTS

| 2007/0284405 A1* | 12/2007 | Prevost .................. A45F 5/02 206/379 |
| 2018/0084894 A1* | 3/2018 | Moreau .................. B25H 3/006 |
| 2020/0194747 A1 | 6/2020 | Rudolph et al. |
| 2020/0227695 A1 | 7/2020 | Jones et al. |

FOREIGN PATENT DOCUMENTS

| CN | 203205468 U | 9/2013 |
| EP | 3 517 254 A1 | 7/2019 |
| WO | 2015/048285 A1 | 4/2015 |
| WO | 2019/060838 A2 | 3/2019 |

OTHER PUBLICATIONS

Sep. 2, 2025 Office Action issued in Japanese Patent Application No. 2021151969.

* cited by examiner

*Primary Examiner* — Karie O'Neill Apicella
(74) *Attorney, Agent, or Firm* — Oliff PLC

(57) ABSTRACT

A strap is connectable to a battery pack without any specific portion for connection to the strap. A battery holder connects a strap to a battery pack detachably attachable to a tool body of a power tool. The battery holder includes a belt member that is detachably wound around an overall circumference of the battery pack, and a strap coupler to which the strap is detachably connectable.

19 Claims, 13 Drawing Sheets

BATTERY HOLDER

CROSS-REFERENCE TO RELATED APPLICATIONS

This application claims the benefit of priority to Japanese Patent Application No. 2021-151969, filed on Sep. 17, 2021, the entire contents of which are hereby incorporated by reference.

BACKGROUND

1. Technical Field

The present disclosure relates to a battery holder to attach a suspension strap to a battery pack usable as, for example, a power supply for a rechargeable power tool.

2. Description of the Background

A battery pack is, for example, detachably attached by sliding to a battery mount of a rechargeable power tool. A tether strap or another strap is attached to a power tool or to a battery pack for drop prevention. As described in U.S. Patent Application Publication No. 2020/0227695 and U.S. Patent Application Publication No. 2020/0194747, the battery pack includes a dedicated portion for connecting the strap, such as a through-hole for a strap.

BRIEF SUMMARY

A battery pack is to include a dedicated portion for connecting a strap, such as a through-hole. A battery pack without any dedicated portion, such as a through-hole for a strap, cannot easily receive a suspension strap.

One or more aspects of the present disclosure are directed to a structure allowing attachment of a strap to a battery pack without any dedicated portion such as a through-hole for a strap.

A first aspect of the present disclosure provides a battery holder for connecting a strap to a battery pack, the battery pack being detachably attachable to a tool body of a power tool, the battery holder including:
- a belt member configured to be detachably wound around an overall circumference of the battery pack; and
- a strap coupler to which the strap is detachably connectable.

The structure according to the above aspects of the present disclosure allows a strap to be connected to a battery pack without any specific portion for connection to the strap.

DETAILED DESCRIPTION

First Embodiment

Figure 1:
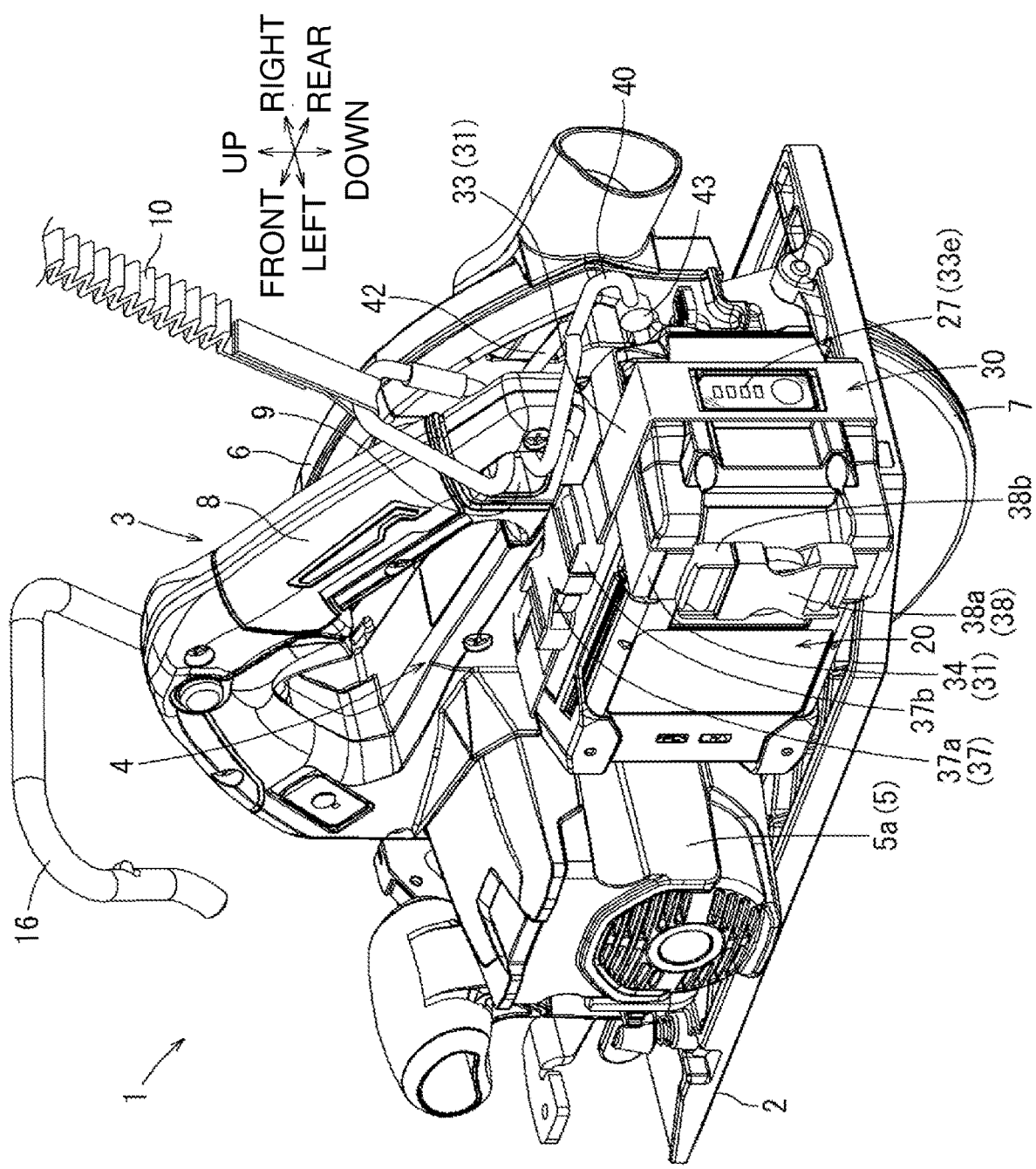
FIG. 1 is an overall perspective view of a power tool as viewed from the diagonally left rear where an operator stays.
Figure 2:
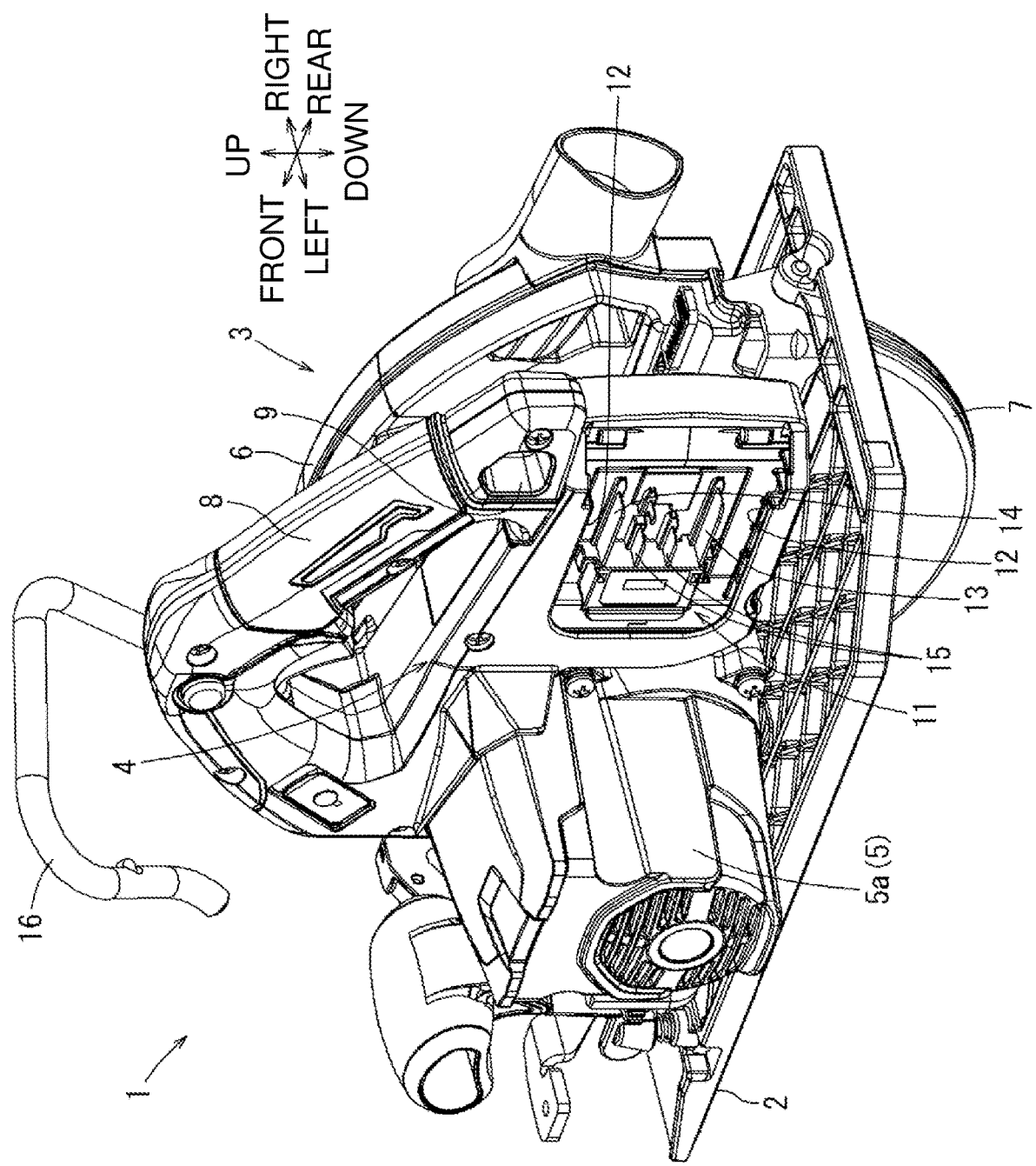
FIG. 2 is an overall perspective view of the power tool with a battery pack being detached.

FIGS. 1 and 2 show a portable circular saw that is a type of portable cutting machine as an example of a power tool 1. The power tool 1 includes a rectangular base 2 and a tool body 3. The base 2 comes in contact with a workpiece (not shown). The tool body 3 is supported on an upper surface of the base 2. The tool body 3 includes an electric motor 5 on the left of a body case 4. The electric motor 5 is accommodated in a cylindrical motor case 5a.

The body case 4 supports a tipped saw (not shown) that is a type of disk-shaped cutting tool on the right. A stationary cover 6 integral with the body case 4 covers an upper portion of a cutting blade. The cutting blade has a lower portion protruding from a lower surface of the base 2. The cutting blade has the lower portion protruding from the lower surface of the base 2 to cut into the workpiece. The cutting blade has the lower portion protruding from the lower surface of the base 2 covered with a movable cover 7. The tool body 3 has a metal hook 16 on the front. When, for example, not in use, the power tool 1 can be hooked with the hook 16 on another site, such as on a scaffold.

A looped handle 8 is above the body case 4. An operator behind the power tool 1 grips the handle 8 and moves the hand forward to cut the workpiece with the cutting blade. For the power tool 1, the front is the direction of cutting and the rear is where the operator stays. The vertical direction and the lateral direction are defined as viewed from the operator. For the battery pack 20 being detached as a single unit, the directions are defined separately as shown in FIG. 3.

The handle 8 has a strap hole 9 in its rear portion. A suspension strap for tools (tool strap 10) is connected to the strap hole 9. FIG. 1 shows a highly elastic tool strap 10. As shown in FIG. 2, a battery mount 11 is located below the strap hole 9 and behind the electric motor 5. The battery mount 11 receives a battery pack 20 that is attachable by sliding. The electric motor 5 is activated with power from the attached battery pack 20.

The battery mount 11 includes a pair of upper and lower rail receivers 12. The upper and lower rail receivers 12 are parallel to each other and extend in the front-rear direction. A positive terminal 13 and a negative terminal 14 are located between the upper and lower rail receivers 12. A control terminal 15 is located between the positive terminal 13 and the negative terminal 14.

Figure 3:
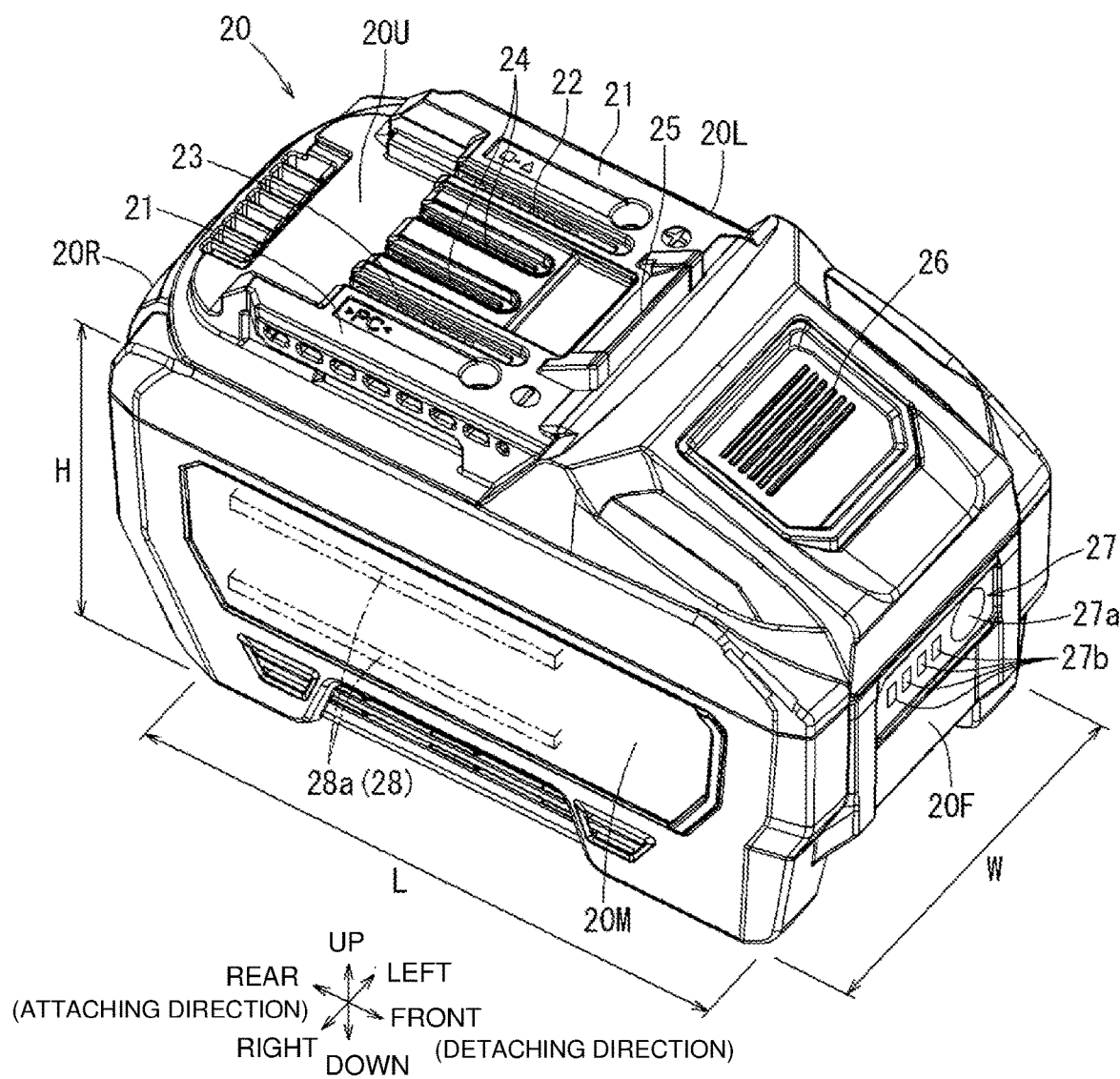
FIG. 3 is a perspective view of the battery pack alone.

FIG. 3 shows the battery pack 20 detached from the battery mount 11. The battery pack 20 is a lithium-ion battery accommodating multiple battery cells in a substantially rectangular case (hexahedron). The battery pack 20 has an upper surface 20U, a bottom (lower) surface 20B, a front surface 20F, a rear surface 20R, a left side surface 20L, and a right side surface 20M. The battery pack 20 in the present embodiment has the longest distance between the front surface 20F and the rear surface 20R (front-rear length L). A distance between the left side surface 20L and the right side surface 20M (lateral width W) is shorter than the length L. A distance between the upper surface 20U and the bottom surface 20B (height H) is the shortest. Thus, the length L, the width W, and the height H of the battery pack 20 satisfy the relationship written as the length L>the width W>the height H.

The battery pack 20 is attached to the battery mount 11 in a posture with the upper surface 20U facing the left side of the power tool 1. As shown in FIG. 3, in each direction of the detached battery pack 20 alone, the posture of the battery pack 20 basically has the upper surface 20U facing upward and the bottom surface 20B grounded. Thus, the direction perpendicular to the upper surface 20U is defined as the vertical direction, the direction of attachment to the battery mount 11 is defined as the forward direction, and the direction of detachment from the battery mount 11 is defined as the backward direction. The right-left direction is defined as viewed from the operator who stays at the rear.

The upper surface 20U of the battery pack 20 includes a pair of right and left rails 21. The left and right rails 21 are parallel to each other and extend in the front-rear direction. A positive terminal receiver 22, a negative terminal receiver 23, and a control terminal receiver 24 are located between the right and left rails 21.

A lock tab 25 is located in front of the control terminal receiver 24 in a vertically movable manner. The lock tab 25 holds the battery pack 20 in place on the battery mount 11. A rectangular flat-shaped unlocking button 26 is located in front of the lock tab 25. As the unlocking button 26 is pressed toward the bottom surface 20B with a fingertip, the lock tab 25 retracts downward. To detach the battery pack 20 from the battery mount 11, the battery pack 20 can be slid forward (to the rear of the power tool 1) with the unlocking button 26 being pressed downward.

The battery pack 20 is slid backward (toward the front portion of the power tool 1) in a posture with the upper surface 20U facing the left side of the power tool 1. This causes the rails 21 to engage with the rail receivers 12 in the battery mount 11, causing the battery mount 11 to mechanically receive the battery pack 20. The positive terminal 13, the negative terminal 14, and the control terminal 15 in the battery mount 11 are then received in the positive terminal receiver 22, the negative terminal receiver 23, and the control terminal receiver 24 in the battery pack 20. This electrically connects the battery pack 20 to the battery mount 11.

The battery pack 20 includes, on the front surface 20F, a display 27 indicating the remaining power level and other information. The display 27 includes a push button 27a that is pressed to turn on the number of light-emitting diodes (LEDs) 27b corresponding to the remaining power level. The remaining power level of the battery pack 20 is indicated by the number of LEDs 27b to be illuminated.

The battery pack 20 includes no specific portion for connection to a suspension strap. A battery holder 30 that is an example of the present disclosure can be attached to the battery pack 20. The battery pack 20 can be used without any specific changes. As shown in FIG. 1, the battery pack 20 with the battery holder 30 according to the present embodiment is attached to the battery mount 11 in the power tool 1.

A suspension strap (battery strap 40) can be connected to the battery pack 20 with the battery holder 30.

Figure 4:
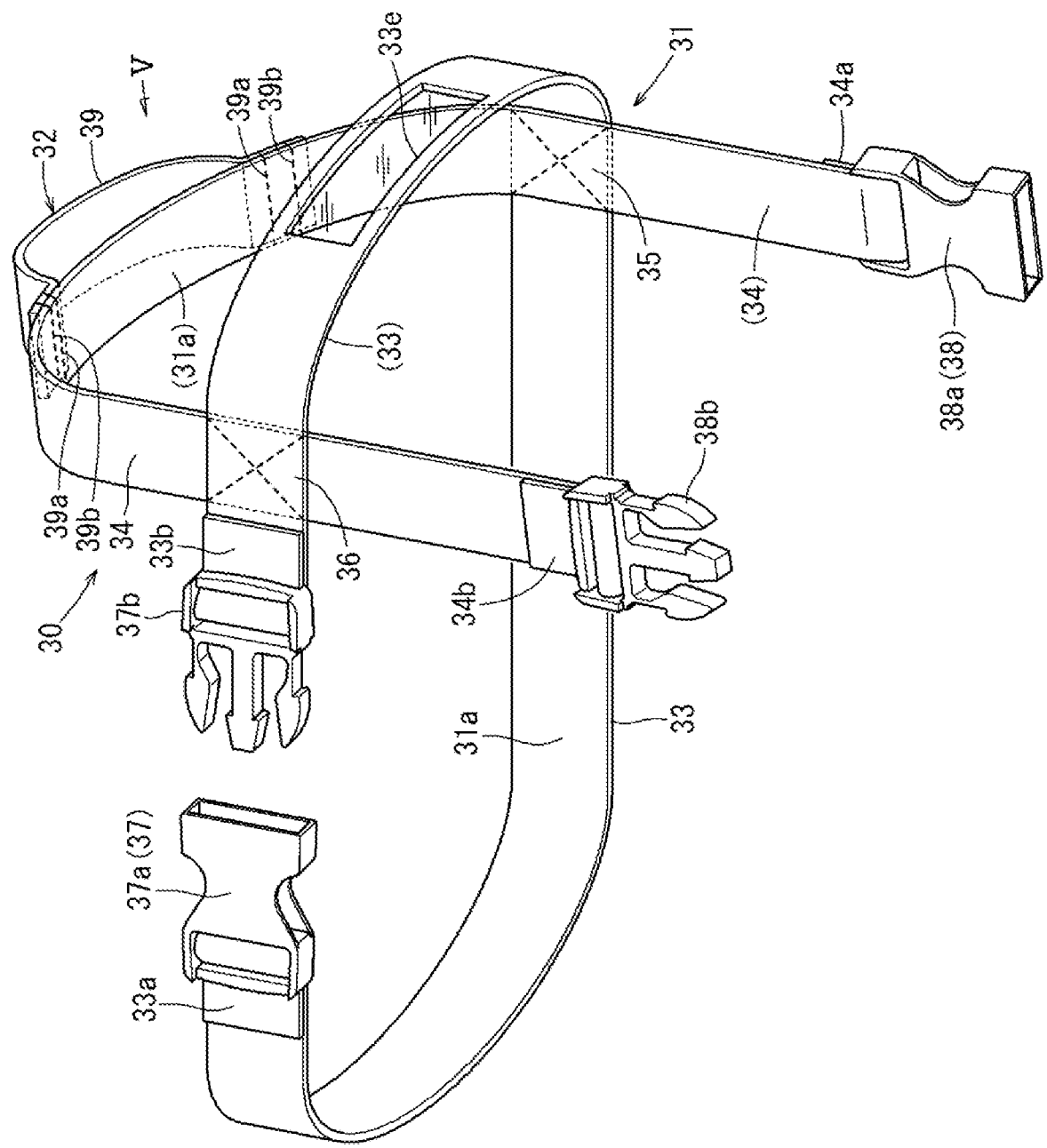
FIG. 4 is a perspective view of a battery holder according to a first embodiment.

The battery holder 30 receives the battery pack 20 in a detachable manner. FIG. 4 shows the detached battery holder 30. The battery holder 30 includes a belt member 31 and a strap coupler 32. The belt member 31 is wound around the battery pack 20. The battery strap 40 is connected to the strap coupler 32. The belt member 31 includes a first belt 33 and a second belt 34. The first belt 33 and the second belt 34 are formed from a material (belt material) with appropriate flexibility for winding and sufficient tensile strength against a tensile load applied during winding. The belt material in the present embodiment is, for example, a strong fabric. The first belt 33 and the second belt 34 are sewn together at stitched portions 35 and 36 at two intersections in the longitudinal direction. The belt member 31 includes, on its inner surface, a friction member 31a formed from an elastomer. The friction member 31a reduces slipping of the belt member 31 off the outer surface of the battery pack 20.

FIGS. 6 to 9 show the battery holder 30 attached to the battery pack 20 with the belt member 31 wound around it. The first belt 33 is wound around a front surface 20F, a left side surface 20L, a rear surface 20R, and a right side surface 20M on the battery pack 20 in the front-rear (horizontal) direction. The second belt 34 is wound around the upper surface 20U, the left side surface 20L, the bottom surface 20B, and the right side surface 20M of the battery pack 20 in the up-down (vertical) direction. Thus, the first belt 33 is longer than the second belt 34.

The first belt 33 and the second belt 34 are each wound in a loop with side release buckles 37 and 38. The first belt 33 and the second belt 34 each form a loop. In the present embodiment, the belt member 31 is wound around the battery pack 20 with the side release buckle 37 being located on the right side surface 20M and the side release buckle 38 on the bottom surface 20B of the battery pack 20.

As shown in FIG. 4, a first fastener 37a is attached to one end (first portion) of the first belt 33 in the longitudinal direction. A second fastener 37b is attached to the other end (second portion) of the first belt 33 in the longitudinal direction. The second fastener 37b is coupled to the first fastener 37a to allow the first belt 33 to be in a loop along the outer surface of the battery pack 20 in the horizontal direction.

A third fastener 38a is attached to one end (first portion) of the second belt 34 in the longitudinal direction. A fourth fastener 38b is attached to the other end (second portion) of the second belt 34 in the longitudinal direction. The fourth fastener 38b is coupled to the third fastener 38a to allow the second belt 34 to be in a loop along the outer surface of the battery pack 20 in the vertical direction.

The first fastener 37a and the second fastener 37b in the first belt 33 are included in the side release buckle 37. The third fastener 38a and the fourth fastener 38b in the second belt 34 are included in the side release buckle 38. The first belt 33 and the second belt 34 in the present embodiment can adjust their lengths with side release buckles 37 and 38.

Figure 10:
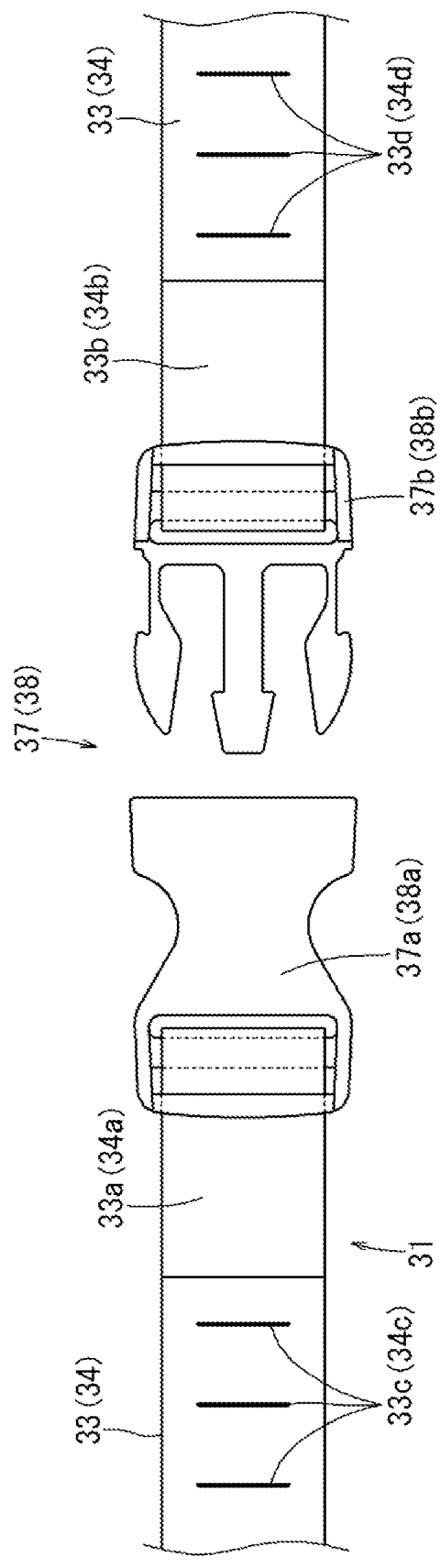
FIG. 10 is a plan view of a side release buckle.

As shown in FIG. 10, the first belt 33 includes folded portions 33a and 33b attached to the first fastener 37a and the second fastener 37b as a length adjuster. The position of the first or second fastener 37a or 37b with respect to the first belt 33 can be adjusted by adjusting the length of the folded portion 33a or 33b. The length of the first belt 33 (the length of the loop) is thus adjustable. The folded portions 33a and 33b function as a length adjuster to adjust the length of the loop.

The second belt 34 includes folded portions 34a and 34b attached to the third fastener 38a and the fourth fastener 38b as a length adjuster. The position of the third or fourth fastener 38a or 38b with respect to the second belt 34 can be adjusted by adjusting the length of the folded portion 34a or 34b. The length of the second belt 34 (the length of the loop) is thus adjustable. The folded portions 34a and 34b function as a length adjuster to adjust the length of the loop.

The length of the loops of the first belt 33 and the second belt 34 is adjusted to allow the belt member 31 to be wound around the outer surface of the battery pack 20 tightly without slack. Marks 33c and 33d on the outer surface of the first belt 33 near the two ends indicate the folding positions of the folded portions 33a and 33b. Marks 34c and 34d on the outer surface of the second belt 34 near the two ends indicate the folding positions of the folded portions 34a and 34b. Marks 33c, 33d, 34c, and 34d allow quick and appropriate positioning of the side release buckles 37 and 38 as well as intended position adjustment repeatedly.

Figure 6:
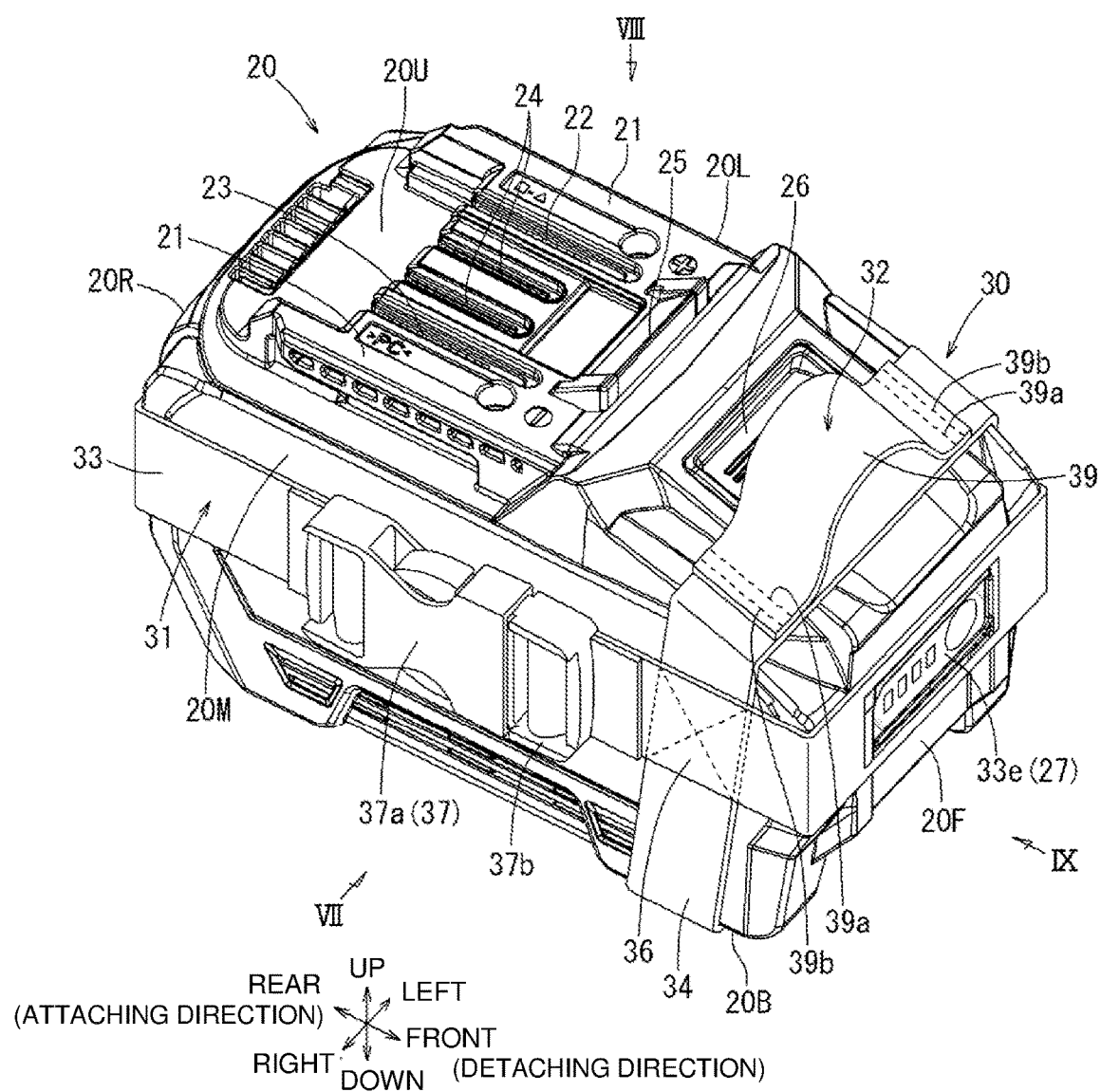
FIG. 6 is a perspective view of the battery pack with the battery holder attached.
Figure 7:
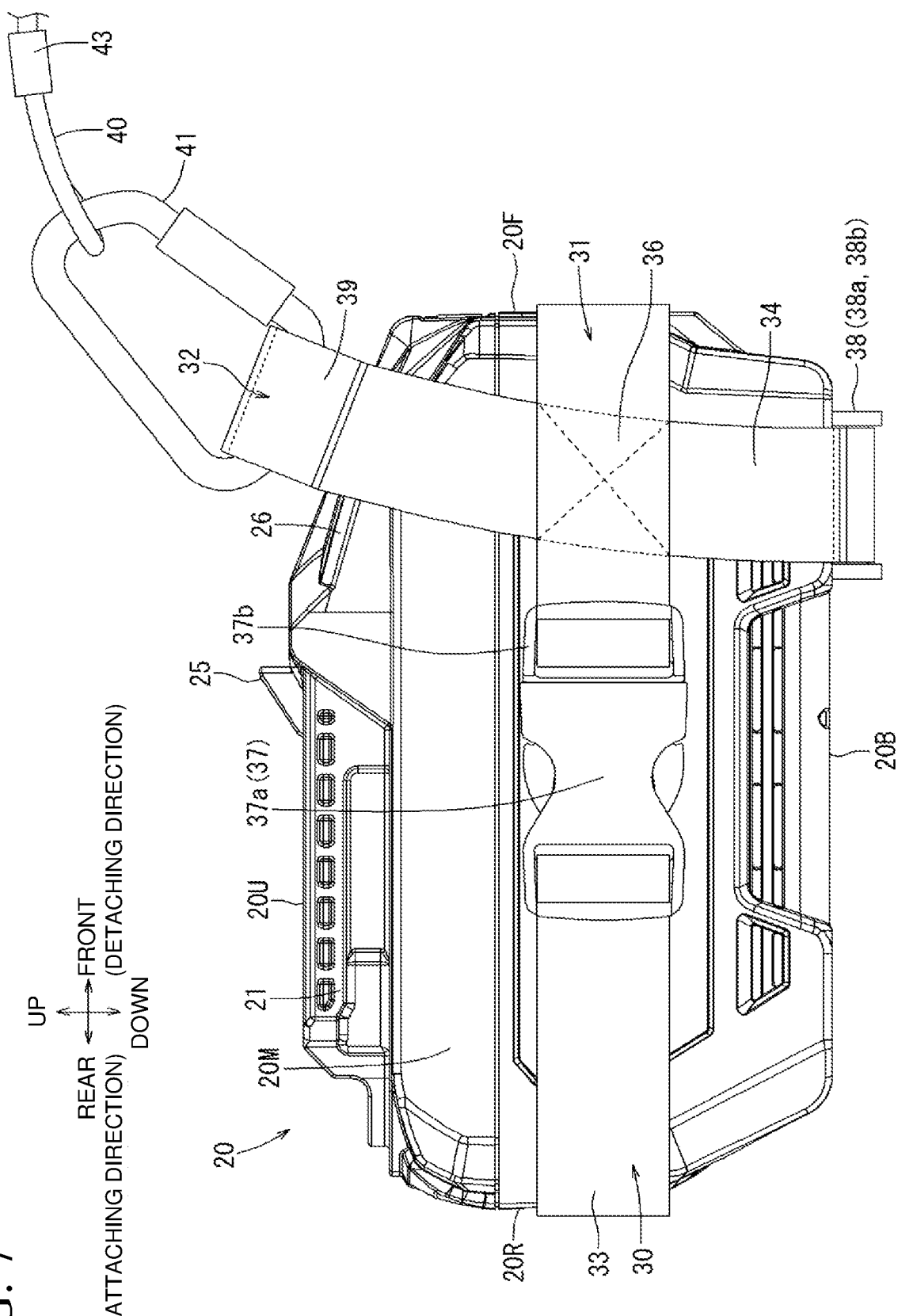
FIG. 7 is a right side view of the battery pack with the battery holder attached as viewed in the direction indicated by arrow VII in FIG. 6.
Figure 8:
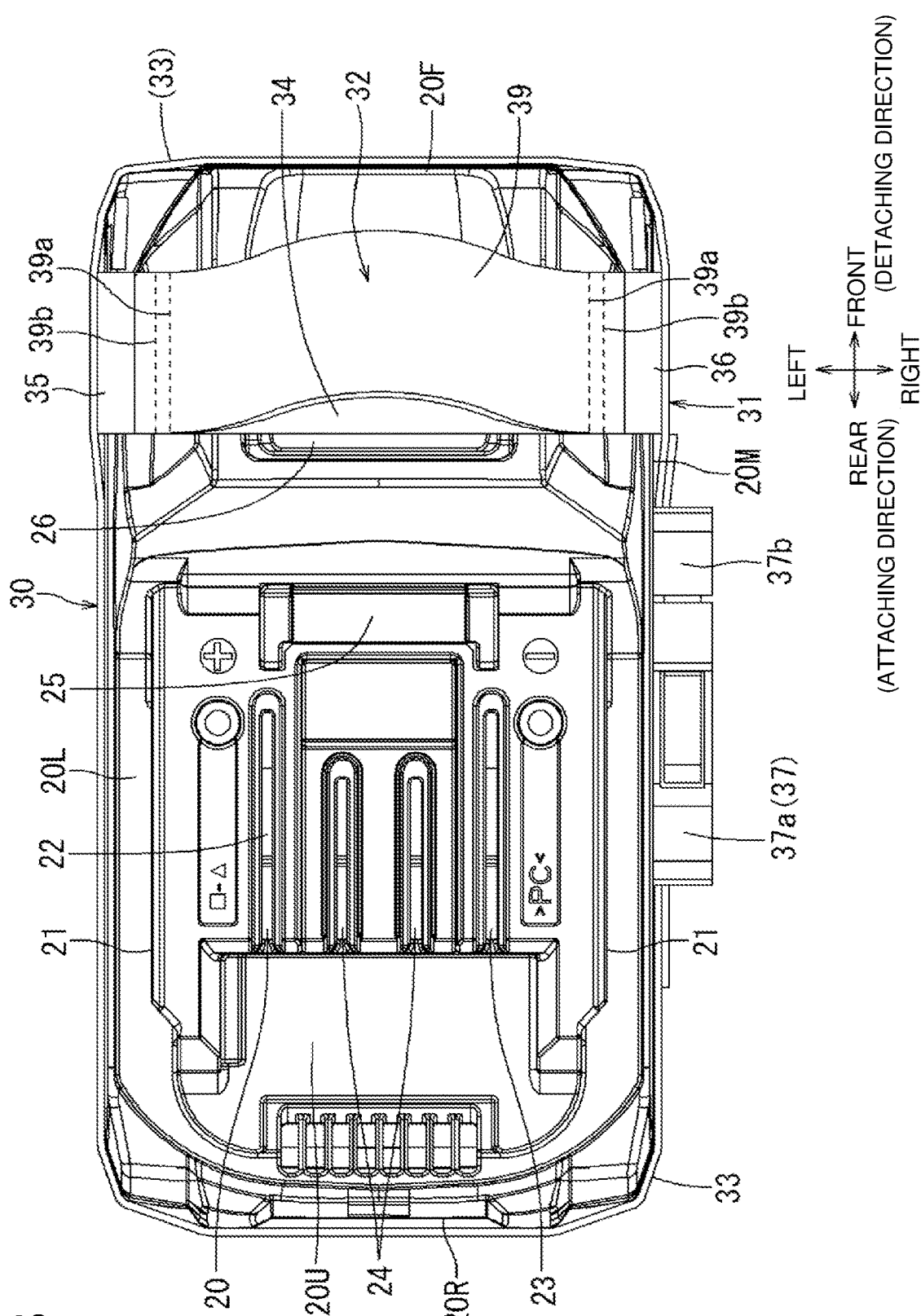
FIG. 8 is a top view of the battery pack with the battery holder attached as viewed in the direction indicated by arrow VIII in FIG. 6.
Figure 9:
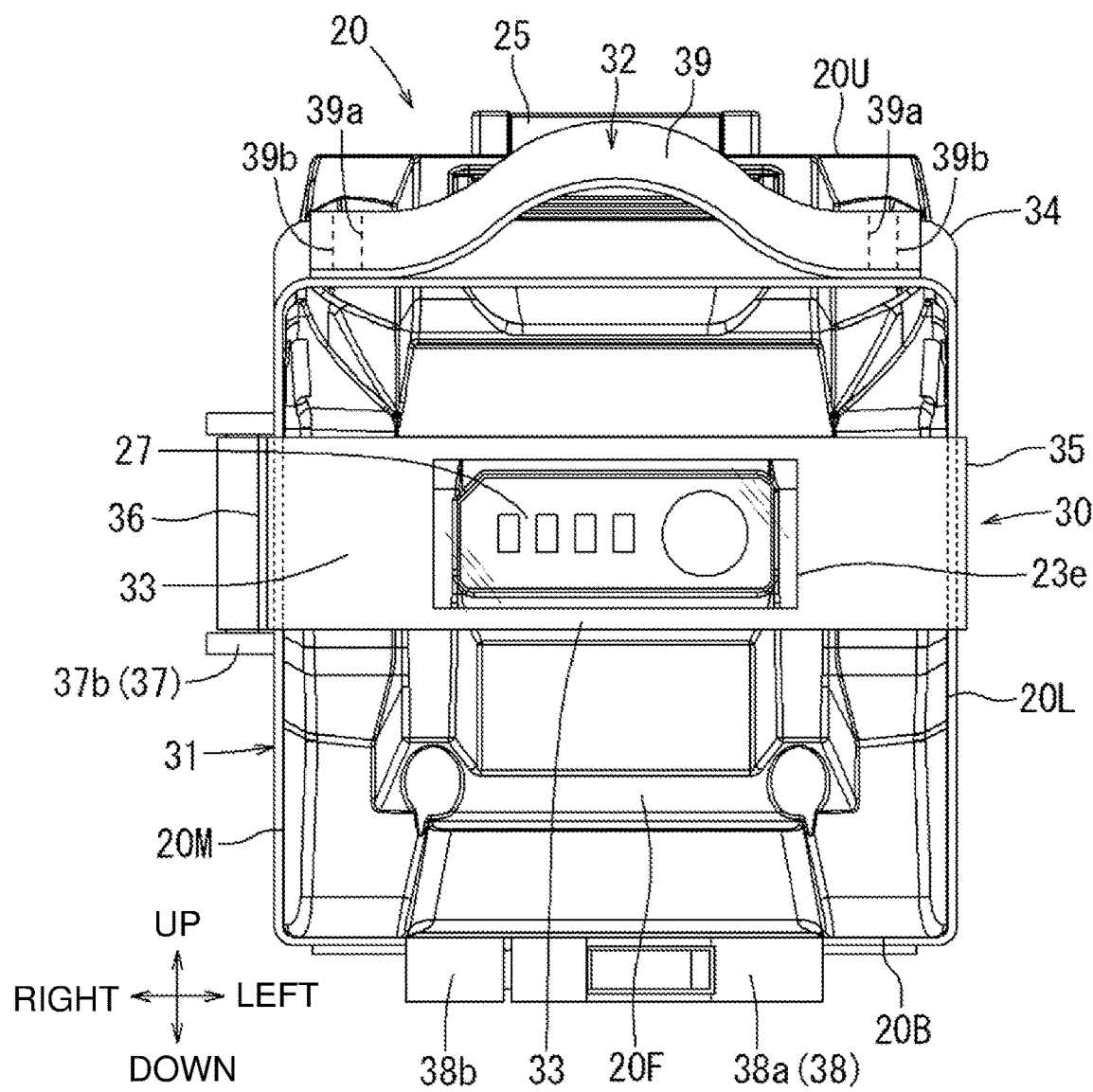
FIG. 9 is a front view of the battery pack with the battery holder attached as viewed in the direction indicated by arrow IX in FIG. 6.

As shown in FIG. 6, the second belt 34 is wound around the upper surface 20U of the battery pack 20, particularly along the front portion. The second belt 34 is wound around to cover a part of the unlocking button 26. In the present embodiment, the second belt 34 is wound around the battery pack 20 to leave at least one-fourth or more of the unlocking button being exposed. Thus, the second belt 34 does not interfere with the unlocking button 26 when the unlocking button 26 is to be pressed down, thus increasing operability of the unlocking button 26.

Figure 5:
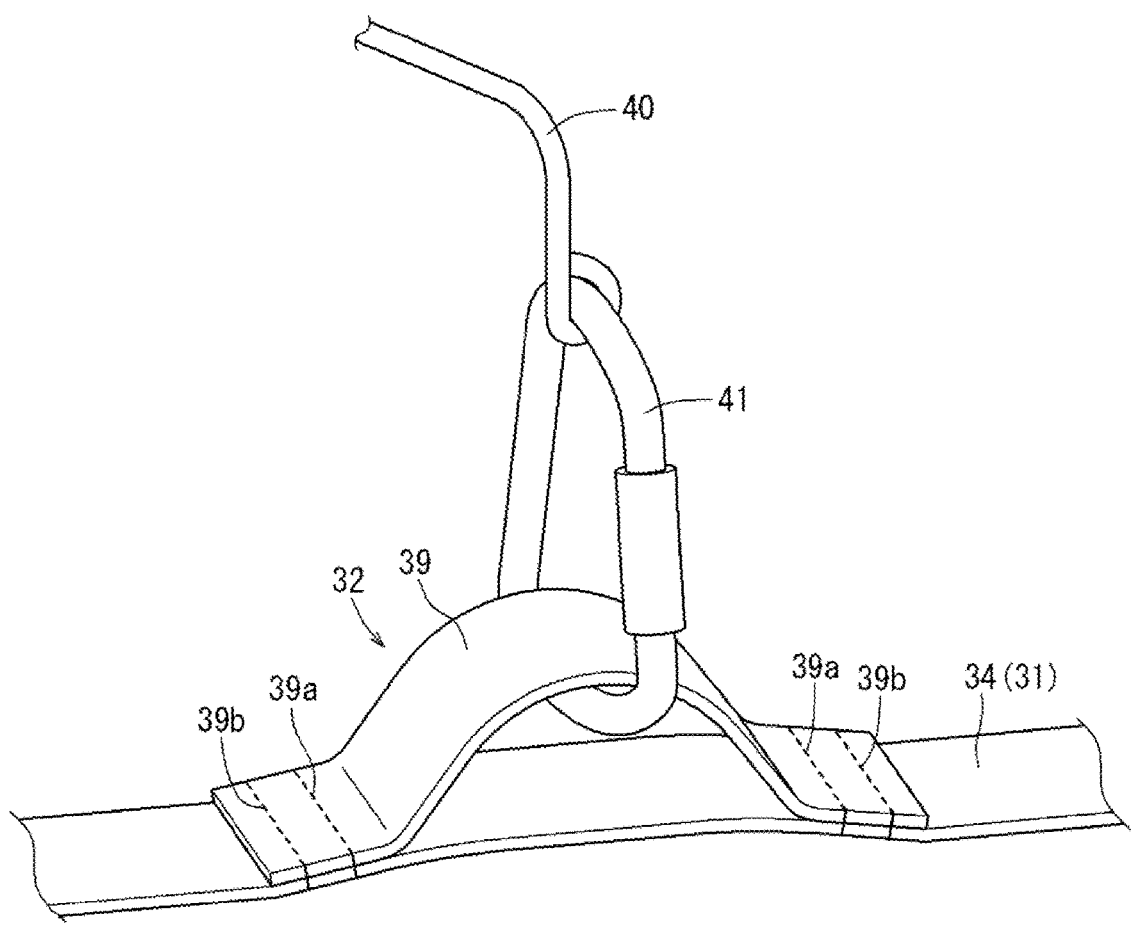
FIG. 5 is a perspective view of a strap coupler.

The strap coupler 32 is located on the second belt 34 covering the unlocking button 26 on the outer surface substantially in the center in the longitudinal direction (opposite to the inner surface in contact with the battery pack 20). As shown in FIG. 5, the strap coupler 32 includes a single coupling member 39. The coupling member 39 is a strap with substantially the same width as the second belt 34. The coupling member 39 is attached along the second belt 34 in the longitudinal direction. The coupling member 39 is formed from a sheet material similar to the material used for the second belt 34. The two ends of the coupling member 39 are sewn to the second belt 34. The two ends of the coupling member 39 are securely sewn with two rows of stitched portions 39a and 39b. The outer stitched portions 39b on the two ends of the coupling member 39 in the present embodiment are sewn with higher strength than the inner stitched portions 39a.

The two ends of the coupling member 39 are sewn at an interval shorter than the length of the coupling member 39. This allows the coupling member 39 to be attached in a loop to the second belt 34. The battery strap 40 is placed between the coupling member 39 and the second belt 34 and is connected as illustrated. As shown in FIGS. 6 to 9, the belt member 31 is wound around the battery pack 20 with the strap coupler 32 positioned near the front of the upper surface of the battery pack 20. This connects the battery strap 40 to the battery pack 20 at a position near the front of the upper surface of the battery pack 20.

The first belt 33 includes an exposed portion 33e on the front surface 20F of the battery pack 20. The exposed portion 33e is substantially rectangular in the longitudinal direction of the first belt 33 and corresponds to the display 27 on the battery pack 20. The display 27 is externally viewable through a light-transmissive member (transparent sheet of a synthetic resin) attached to the exposed portion 33e. The exposed portion 33e may include a window extending in the thickness direction, instead of the transparent sheet. The exposed portion 33e allows reliable viewability of the display 27 with the battery holder 30 attached to the battery pack 20.

The battery strap 40 is connected to the strap coupler 32 on the battery holder 30 wound around the battery pack 20. This connects the battery strap 40 to the battery pack 20. With the battery holder 30 attached, the second belt 34 is wound around the position near the front of the upper surface 20U on the battery pack 20 without covering the rails 21, the positive terminal receiver 22, the negative terminal receiver 23, the control terminal receiver 24, and the lock tab 25. As shown in FIG. 1, the battery mount 11 in the power tool 1 receives the battery pack 20 with the battery holder 30.

The battery pack 20 with the battery holder 30 is attached to the battery mount 11 in the power tool 1 to attach the battery pack 20 to the power tool 1 with the battery strap 40. Thus, the power tool 1 can be used with the battery pack 20 attached with the battery strap 40. Thus, as shown in FIG. 11, for example, the battery pack 20 attached to the power tool 1 with the battery strap 40 can be handled without excess care in detaching the battery pack 20.

Figure 11:
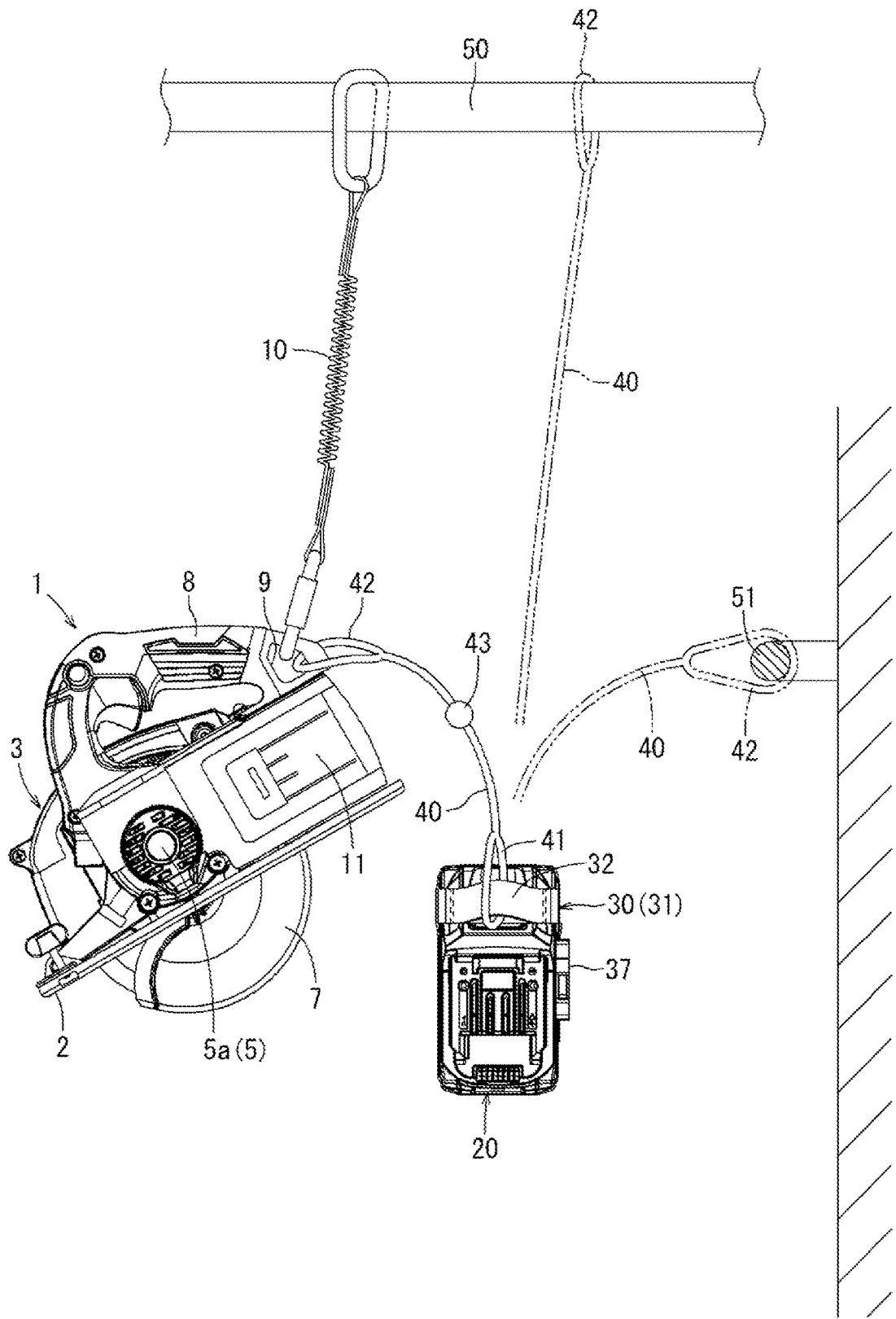
FIG. 11 is a diagram describing the power tool and the battery pack both being suspended.

As shown in FIG. 11, the power tool 1 can be used with the tool strap 10, which is connected to the strap hole 9, connected to a scaffold fence 50 or a wall handrail 51. This allows the power tool 1 and the battery pack 20 to be handled without excess care.

The battery strap 40 is detachably connected to both the strap coupler 32 on the battery holder 30 and the strap hole 9 in the power tool 1. As indicated by the two-dot chain line in FIG. 11, the battery strap 40 can be detached from the strap hole 9 in the power tool 1 and connected to an external member (another site to connect a strap, other than the power tool 1) such as the scaffold fence 50 or the wall handrail 51. The battery pack 20 can be suspended from the external member with the battery strap 40, irrespective of whether being mounted on or detached from the power tool 1.

The battery strap 40 includes a first end 41 on one end. The first end 41 is detachably connected to the strap coupler 32 on the battery holder 30. The battery strap 40 includes a second end 42 on the other end. The second end 42 is detachably connected to the strap hole 9 in the power tool 1. The first end 41 and the second end 42 receive carabiners.

The battery strap 40 can use an adjuster 43 for length adjustment. The battery strap 40 may be long enough to allow a distance for sliding the battery pack 20 for attachment to and detachment from the battery mount 11. This allows the battery pack 20 to be attached to and detached from the battery mount 11 with the battery strap 40 being connected to the strap hole 9 in the power tool 1. The battery strap 40 may be formed from an elastic material, such as a rubber cord.

The battery holder 30 with the above structure allows the battery strap 40 to be connected to the battery pack 20 without any specific portion for connection to the battery strap 40. Thus, the battery strap 40 can be used for the battery pack 20 that has not been used with the battery strap 40.

The battery holder 30 is retrofittable. This expands the range of models for the battery pack 20 to which the battery strap 40 can be connected. The battery holder 30 is detachable from the battery pack 20. This allows the battery holder 30 to be used for other battery packs.

The belt member 31 in the present embodiment is formed from a sheet material with flexibility and tensile strength. This allows the belt member 31 with appropriate flexibility and sufficient tensile strength to be tightly wound around the battery pack 20 in conformance with the outer shape of the battery pack 20. The belt material for the belt member 31 is a strong fabric, synthetic fiber, leather, or a soft resin material that allows flexibility for winding around the battery pack 20 and can withstand a tensile force applied during winding. Multiple different materials may be combined to form the belt member 31.

The belt member 31 in the present embodiment includes the horizontal first belt 33 and the vertical second belt 34 that allow the battery holder 30 to be attached more tightly to the rectangular battery pack 20. The first belt 33 and the second belt 34 are sewn together with their longitudinal directions crossing at substantially right angles.

In the present embodiment, the two ends of the coupling member 39 in the strap coupler 32 are securely sewn with the two rows of the stitched portions 39a and 39b. The outer stitched portions 39b on the two ends of the coupling member 39 are sewn with higher strength than the inner stitched portions 39a. This enhances the durability of the strap coupler against impact. When, for example, the inner stitched portions 39a included in the two rows of stitched portions 39a and 39b are disconnected under impact, the outer stitched portions 39b maintain the bonding of the strap coupler 32 to the belt member 31. The inner stitched portions 39a being disconnected cause the coupling member 39 to be displaced, thus increasing the insertion space between the belt member 31 and the coupling member 39. The expansion of the inner insertion space is viewed by an operator who thus learns that the inner stitched portions 39a have been disconnected under impact.

The first belt 33 and the second belt 34 in the present embodiment are wound around the battery pack 20 in a loop with side release buckles 37 and 38. The belt member 31 with this simple structure can be tightly wound around the battery pack 20. The length of the loop is adjustable by changing the position of the first to fourth fasteners 37a, 37b, 38a, and 38b in the side release buckles 37 and 38. This allows the belt member 31 to be reliably wound around the battery pack 20 to fit the size (a length L, a width W, and a height H) of the battery pack 20.

The first belt 33 in the present embodiment has the mark 33c on one end and the mark 33d on the other end. The marks 33c and 33d can be used, for example, to adjust the length of the loop of the belt member 31 with a length adjuster (side release buckles 37 and 38) to accommodate multiple battery packs 20 with different sizes. This allows the belt member 31 to be quickly wound around the battery packs 20 in different sizes with appropriate strength. The marks 33c and 33d allow winding of the belt member 31 around the battery pack 20 repeatedly. The same applies to the marks 34c and 34d on the second belt 34.

The exposed portion 33e of the belt member 31 in the present embodiment is at the position covering the display 27 in the battery pack 20. This allows the display 27 to be externally viewable with the battery holder 30 being attached.

The belt member 31 is wound around the battery pack 20 in the present embodiment to leave at least one-fourth or more of the unlocking button 26 being exposed. Thus, the battery pack 20 can be detached from the battery mount 11 in the tool body 3 by operating the unlocking button 26 while the battery holder 30 remains attached.

The belt member 31 in the present embodiment includes, on its inner surface, the friction member 31a formed from an elastomer. This structure reduces slipping of the belt member 31 off the battery pack 20 and reduces the positional deviation of the winding portion. The friction member 31a may be laminated (applied) in layers on the inner surface of the belt member 31, or may include elastomer protrusions or ridges arranged in a dispersed manner.

The battery holder 30 according to the present embodiment includes the battery strap 40. The battery strap 40 has a strap length that allows the battery pack 20 to be attached to and detached from the tool body 3 with the first end 41 connected to the strap coupler 32 and with the second end 42 connected to the tool body 3. This allows the battery pack 20 to be detached from the tool body 3 with the first end 41 of the battery strap 40 being connected to the battery pack 20 and with the second end 42 being connected to the tool body 3.

The second end 42 of the battery strap 40 in the present embodiment can be selectively connected to the tool body 3 or to an external member. The operator can thus freely select whether to connect the battery pack 20 to the tool body 3 with the battery strap 40 or to the external member such as the fence 50 or the handrail 51 located around the work area. The second end 42 can also be connected to the external member such as a scaffold or a handle portion.

The battery strap 40 in the present embodiment includes the adjuster 43 for adjusting the distance between the first end 41 and the second end 42. The adjuster 43 can adjust the battery strap 40 to an appropriate length. The battery strap 40 is shortened with the adjuster 43 to reduce the likelihood of the battery pack 20 slipping off the tool body 3. The battery strap 40 is also connected to avoid obstructing the operation. The battery strap 40 can be lengthened with the adjuster 43 to expand the range of positions for the strap coupler (other than the strap hole 9) on the tool body 3 to which the second end 42 can be connected. The battery strap 40 can be connected to a site away from the operator, thus expanding the range of positions for the external member.

The embodiment described above may be modified variously. Although the strap coupler 32 is at one position on the battery holder 30, the structure may also include multiple strap couplers. A strap coupler at an appropriate portion may be selected depending on the work operation to enhance the operational efficiency.

Second Embodiment

Figure 12:
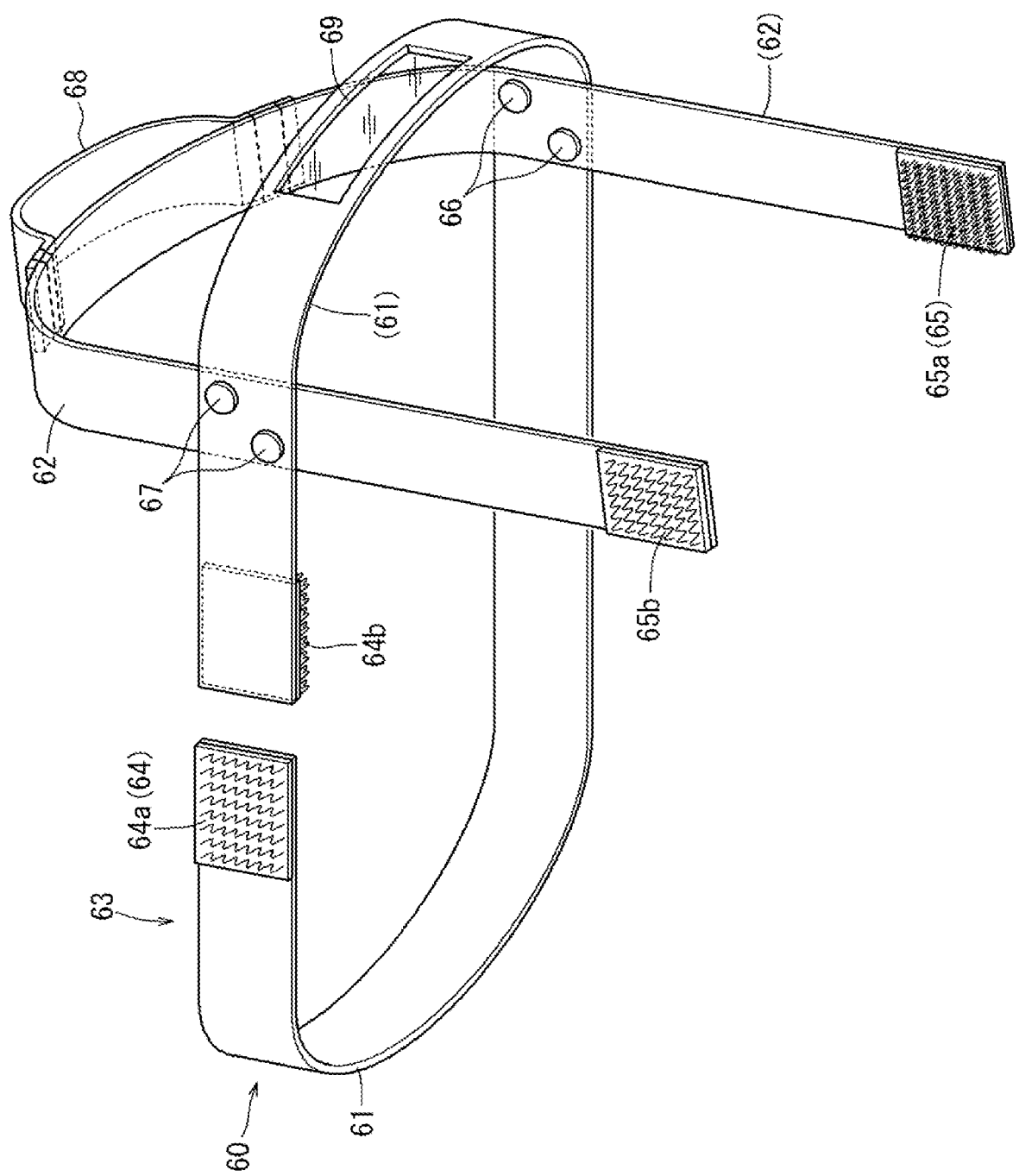
FIG. 12 is a perspective view of a battery holder according to a second embodiment.

FIG. 12 shows a battery holder 60 according to a second embodiment. The components and the structure similar to those in the battery holder 30 according to the first embodiment without any modification are denoted by the corresponding reference numerals and will not be described. The battery holder 60 according to the second embodiment includes a belt member 63 and a strap coupler 68. The belt member 63 includes a first belt 61 and a second belt 62 connected together. The battery strap 40 is connected to the strap coupler 68. The first belt 61 and the second belt 62 are formed from a material (belt material) with appropriate flexibility for winding and sufficient tensile strength for a tensile load applied during winding. The belt material in the second embodiment is, for example, a strong fabric. The strap coupler 68 is located on the second belt 62 as in the first embodiment. The strap coupler 68 is located near the front of the upper surface of the battery pack 20. In the same manner as in the first embodiment, an exposed portion 69 in the first belt 61 allows reliable viewability of the display 27 on the battery pack 20.

The belt member 63 in the second embodiment includes hook-and-loop fasteners 64 and 65, instead of the side release buckles 37 and 38 in the first embodiment. As shown in FIG. 12, a first fastener 64a is attached to one end (first portion) of the first belt 61 in the longitudinal direction. A second fastener 64*b* is attached to the other end (second portion) of the first belt 61 in the longitudinal direction. The first fastener 64*a* and the second fastener 64*b* overlap each other in the thickness direction to join the hook-and-loop fastener 64. The first belt 61 thus has a loop to be wound around the battery pack 20 in the horizontal direction.

A third fastener 65*a* is attached to one end (first portion) of the second belt 62 in the longitudinal direction. A fourth fastener 65*b* is attached to the other end (second portion) of the second belt 62 in the longitudinal direction. The third fastener 65*a* and the fourth fastener 65*b* overlap each other in the thickness direction to join the hook-and-loop fastener 65. The second belt 62 thus has a loop to be wound around the battery pack 20 in the vertical direction.

The length of the loop of the first belt 61 is adjusted by selectively changing the range of overlap in the longitudinal direction between the first fastener 64*a* and the second fastener 64*b* in the hook-and-loop fastener 64. The hook-and-loop fastener 64 functions as a length adjuster. The length of the loop of the second belt 62 is adjusted by selectively changing the range of overlap in the longitudinal direction between the third fastener 65*a* and the fourth fastener 65*b* in the hook-and-loop fastener 65. The hook-and-loop fastener 65 functions as a length adjuster. The lengths of the loops of the first belt 61 and the second belt 62 are adjusted with the hook-and-loop fasteners 64 and 65 to allow the belt member 63 to be tightly wound around the battery pack 20 to fit the size (a length L, a width W, a height H) of the battery pack 20.

In the second embodiment, metal rivets 66 and 67 are used in place of the stitched portions 35 and 36 in the first embodiment. The first belt 61 and the second belt 62 are joined together with the metal rivets 66 and 67 at two longitudinal intersections. As shown in the figure, two metal rivets 66 are located at one of the two intersections, and two rivets 67 are located at the other intersection. This allows the first belt 61 and the second belt 62 to be securely joined together as in the first embodiment.

The battery holder 60 according to the second embodiment allows the battery strap 40 to be connected to the battery pack 20 without any specific portion for connection to the battery strap 40. The hook-and-loop fasteners 64 and 65 in the second embodiment also allow the lengths of the first belt 61 and the second belt 62 to be properly adjusted and the belt member 63 to be tightly wound around the battery pack 20.

Third Embodiment

Figure 13:
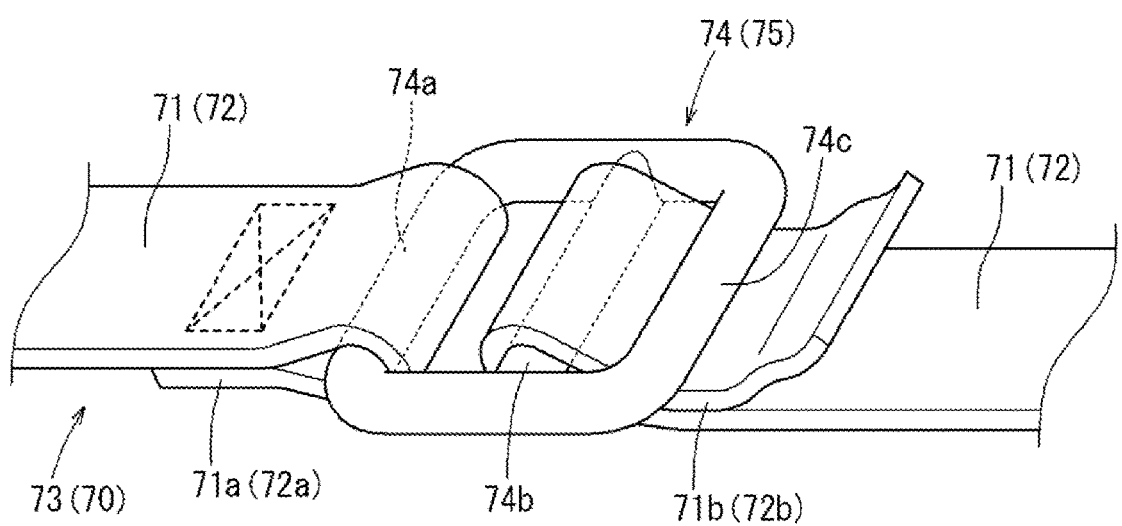
FIG. 13 is a partial perspective view of a battery holder according to a third embodiment showing a belt coupler in a belt member in an enlarged manner.

FIG. 13 shows a belt coupler (a first connector 74 or a second connector 75) on a battery holder 70 according to a third embodiment. The battery holder 70 in the third embodiment, as in the first and second embodiments, includes a first belt 71 and a second belt 72 formed from a belt material. The first belt 71 and the second belt 72 are sewn together with their longitudinal directions crossing at substantially right angles to form a belt member 73. Although not shown in the figure, the second belt 72 includes the strap coupler for the battery strap 40 as in the first and second embodiments. The strap coupler in the third embodiment has the same structure as the strap coupler 32 in the first embodiment or the strap coupler 68 in the second embodiment. The same features as in the first and second embodiments will not be described.

The two ends of the first belt 71 are connected together with the first connector 74. The first belt 71 thus forms a loop. The loop of the first belt 71 is wound around the battery pack 20 in the horizontal direction. The two ends of the second belt 72 are connected together with the second connector 75. The second belt 72 thus forms a loop. The loop of the second belt 72 is wound around the battery pack 20 in the vertical direction.

The first connector 74 and the second connector 75 have the same shape. The first connector 74 is illustrated in the figure. The first connector 74 has a frame shape including first, second, and third frames 74*a*, 74*b*, and 74*c* that are parallel to one another. The first belt 71 has one end 71*a* wound around and joined to the first frame 74*a*. The end 71*a* wound around the first frame 74*a* is sewn.

The first belt 71 has the other end 71*b* wound around the second frame 74*b*. The other end 71*b* is folded back from the second frame 74*b* and held between the first belt 71 and the third frame 74*c*. The folded portion is held between first belt 71 and the third frame 74*c* to join the other end 71*b* to the first connector 74.

The other end 71*b* is loosened to change the length of the folded portion. The length of the loop of the first belt 71 is thus adjustable. The first connector 74 functions as a length adjuster. This allows the first belt 71 to be tightly wound around the battery packs in different sizes. The third frame 74*c* is loosened to release the other end 71*b* from the second frame 74*b*. This separates the end 71*a* from the other end 71*b* of the first belt 71.

Similarly to the first belt 71, the length of the folded portion is changed at the other end 72*b* relative to the second connector 75 to adjust the length of the loop of the second belt 72. The second connector 75 functions as a length adjuster. This allows the second belt 72 to be tightly wound around the battery packs in different sizes. The second connector 75 is loosened to release the end 72*a* from the other end 72*b* of the second belt 72.

The first and second connectors 74 and 75 with the length adjuster allow the belt member 73 to be tightly wound around the battery pack 20. This allows the battery strap 40 to be securely connected to the battery pack 20. In the third embodiment, the first and second connectors 74 and 75 with the simpler structures can be used to strengthen the loops of the first belt 71 and the second belt 72. This enhances the impact resistance and the weather resistance of the battery holder 70.

The first to third embodiments may be modified further. As indicated by the two-dot chain line in FIG. 3, for example, the battery pack 20 may include belt positioners 28 on its outer surface. The belt positioners 28 are, for example, located on the left and right side surfaces 20L and 20M of the battery pack 20. The belt positioners 28 include, for example, two ridges 28*a* parallel to each other in the front-rear direction. The first belt 33, 61, or 71 wound around between the two ridges 28*a* is restricted from the positional deviation. This can more reliably maintain the first belt 33, 61, or 71 and the belt member 31, 63, or 73 being wound around. Similar belt positioners may be additionally or selectively located on the front and rear surfaces 20F and 20R, and on the upper and bottom surfaces 20U and 20B of the battery pack 20.

Although not shown in the figure, the strap hole 9 in the tool body 3 may include a strap sensor to detect the battery strap 40. The operation control is performed to activate the tool body 3 in response to the strap sensor detecting the battery strap 40. This allows the tool body 3 to be activated for operation, simply when the battery pack 20 is connected to the tool body 3 with the battery strap 40.

Although the first belt 33, 61, or 71 and the second belt 34, 62, or 72 are joined together at two positions in the longitudinal direction in the belt member 31, 63, or 73 in the above embodiments, three or more belts may be joined to one another at one or multiple positions in the belt members. A single belt body including fasteners connectable to each other at the first and the second ends may be used as the belt member.

The two belt bodies may be joined together by adhesion or welding in place of being joined with the stitched portions 35 and 36 or the metal rivets 66 and 67.

The belt member may be formed from synthetic fiber or leather as the material (sheet material). Multiple different materials may be combined to form the belt member. The belt member may be a frame formed from a non-flexible hard resin or metal in place of the sheet material. The frame is operable to be open and closed with a hinge. A draw latch may be used as a fastener to connect the two ends of the frame together.

The power tool 1 is not limited to the illustrated portable circular saw, but may be other power tools including reciprocating cutting machines such as jigsaws and reciprocating saws, drilling tools, and screw tightening machines. The battery pack may not be slidable for attachment and detachment but may be a plug-in stick battery pack.

The power tool 1 in each of the first to third embodiments is an example of the power tool of the present disclosure. The battery pack 20 in each of the first to third embodiments is an example of the battery pack of the present disclosure. The battery strap 40 in each of the first to third embodiments is an example of the battery strap of the present disclosure. The battery holder 30 according to the first embodiment, the battery holder 60 according to the second embodiment, and the battery holder 70 according to the third embodiment each are an example of the battery holder of the present disclosure. The belt member 31 in the first embodiment, the belt member 63 in the second embodiment, and the belt member 73 in the third embodiment each are an example of the belt member of the present disclosure. The strap coupler 32 in the first embodiment, the strap coupler 68 in the second embodiment, and the strap coupler in the third embodiment each are an example of the strap coupler of the present disclosure.

REFERENCE SIGNS LIST 1 power tool
2 base
3 tool body
4 body case
5 electric motor
5a motor case
6 stationary cover
7 movable cover
8 handle
9 strap hole
10 tool strap
11 battery mount
12 rail receiver
13 positive terminal
14 negative terminal
15 control terminal
16 hook
20 battery pack
20U upper surface
20B bottom surface
20F front surface
20R rear surface
20L left side surface
20M right side surface
L length of battery pack 20
W width of battery pack 20
H height of battery pack 20
21 rail
22 positive terminal receiver
23 negative terminal receiver
24 control terminal receiver
25 lock tab
26 unlocking button
27 display
27a push button
27b LED
28 belt positioner
28a ridge
30 battery holder (first embodiment)
31 belt member
31a friction member (elastomer layer)
32 strap coupler
33 first belt
33a, 33b folded portion
33c, 33d mark
33e exposed portion
34 second belt
34a, 34b folded portion
34c, 34d mark
35, 36 stitched portion
37, 38 side release buckle
37a first fastener
37b second fastener
38a third fastener
38b fourth fastener
39 coupling member
39a, 39b stitched portion
40 battery strap
41 first end
42 second end
43 adjuster
50 scaffold fence
51 wall handrail
60 battery holder (second embodiment)
61 first belt
62 second belt
63 belt member
64, 65 hook-and-loop fastener
64a first fastener
64b second fastener
65a third fastener
65b fourth fastener
66, 67 metal rivet
68 strap coupler
69 exposed portion
70 battery holder (third embodiment)
71 first belt
71a one end
71b other end
72 second belt
72a one end
72b other end
73 belt member
74 first connector
74a first frame
74b second frame
74c third frame
75 second connector

What is claimed is:

1. A battery holder for connecting a strap to a battery pack, the battery pack being detachably attachable to a tool body of a power tool, the battery holder comprising:
   a belt member configured to be detachably wound around an overall circumference of the battery pack; and
   a strap coupler to which the strap is detachably connectable,
   wherein the belt member includes a length adjuster configured to adjust a length of a loop of the belt member to be wound around the overall circumference of the battery pack.

2. The battery holder according to claim 1, wherein the belt member comprises a belt material with flexibility and tensile strength.

3. The battery holder according to claim 2, wherein the belt member includes
   a first belt comprising the belt material,
   a second belt comprising the belt material, and
   a belt stitched portion sewing the first belt and the second belt together.

4. The battery holder according to claim 1, wherein
   the strap coupler includes two ends in a longitudinal direction sewn to the belt member, and allows the strap to be through the strap coupler, and
   the two ends of the strap coupler in the longitudinal direction are sewn in at least two rows in the longitudinal direction.

5. The battery holder according to claim 2, wherein the belt member includes
   a first belt comprising the belt material,
   a second belt comprising the belt material, and
   a metal rivet joining the first belt and the second belt together.

6. The battery holder according to claim 1, further comprising:
   a first fastener in a first portion of the belt member in the longitudinal direction; and
   a second fastener in a second portion of the belt member in the longitudinal direction, the second fastener being detachably connectable to the first fastener,
   wherein the belt member has the first fastener and the second fastener connectable together into a loop to be wound around the battery pack.

7. The battery holder according to claim 1, wherein the length adjuster includes a side release buckle including
   a first fastener in a first portion of the belt member in a longitudinal direction, and
   a second fastener in a second portion of the belt member in the longitudinal direction, the second fastener being detachably connectable to the first fastener, and
   the first fastener and the second fastener are connectable together into the loop.

8. The battery holder according to claim 1, wherein the belt member includes
   a first fastener in a first portion in a longitudinal direction, and
   a second fastener in a second portion in the longitudinal direction, the second fastener being configured to overlap the first fastener in a thickness direction to be detachably connected to the first fastener, and
   the first fastener and the second fastener are connectable together into a loop of the belt member to be wound around the battery pack.

9. The battery holder according to claim 1, wherein the length adjuster includes a hook-and-loop fastener, and the belt member includes
   a first fastener in a first portion in a longitudinal direction, and
   a second fastener in the longitudinal direction selectively and detachably connectable to the first fastener at a predetermined position.

10. The battery holder according to claim 1, wherein the belt member includes a mark usable in adjusting the length of the loop of the belt member with the length adjuster for a plurality of battery packs with different sizes.

11. The battery holder according to claim 1, wherein the battery holder includes a plurality of the strap couplers.

12. A battery holder for connecting a strap to a battery pack, the battery pack being detachably attachable to a tool body of a power tool, the battery holder comprising:
   a belt member configured to be detachably wound around an overall circumference of the battery pack; and
   a strap coupler to which the strap is detachably connectable, wherein
   the belt member includes, at a position covering a display on the battery pack, a light transmissive member having light transmissivity allowing external viewability of the display or an exposed portion exposing the display.

13. The battery holder according to claim 1, wherein
   the belt member is wound around the battery pack to leave at least one-fourth or more of an unlocking button being exposed, and the unlocking button is operable to detach the battery pack from the tool body.

14. The battery holder according to claim 1, wherein
   the belt member includes a friction member comprising an elastomer on an inner surface of the belt member.

15. The battery holder according to claim 1, further comprising:
   the strap including a first end connectable to the strap coupler and a second end connectable to the tool body,
   wherein the strap has a strap length allowing the battery pack to be detachably attachable to the tool body with the first end being connected to the strap coupler and the second end being connected to the tool body.

16. The battery holder according to claim 1, further comprising:
   a strap including a first end connectable to the strap coupler and a second end selectively connectable to the tool body or an external member.

17. The battery holder according to claim 1, further comprising:
   a strap including a first end connectable to the strap coupler, a second end selectively connectable to the tool body or an external member, and an adjuster configured to adjust a distance between the first end and the second end.

18. The battery holder according to claim 2, wherein
   the strap coupler includes two ends in a longitudinal direction sewn to the belt member, and allows the strap to be through the strap coupler, and
   the two ends of the strap coupler in the longitudinal direction are sewn in at least two rows in the longitudinal direction.

19. The battery holder according to claim 3, wherein
   the strap coupler includes two ends in a longitudinal direction sewn to the belt member, and allows the strap to be through the strap coupler, and
   the two ends of the strap coupler in the longitudinal direction are sewn in at least two rows in the longitudinal direction.

* * * * *